US007529664B2

(12) United States Patent
Gao

(10) Patent No.: US 7,529,664 B2
(45) Date of Patent: May 5, 2009

(54) SIGNAL DECOMPOSITION OF VOICED SPEECH FOR CELP SPEECH CODING

(75) Inventor: Yang Gao, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 733 days.

(21) Appl. No.: 10/799,533

(22) Filed: Mar. 11, 2004

(65) Prior Publication Data

US 2004/0181399 A1 Sep. 16, 2004

Related U.S. Application Data

(60) Provisional application No. 60/455,435, filed on Mar. 15, 2003.

(51) Int. Cl.
*G10L 15/20* (2006.01)

(52) U.S. Cl. ...................................... 704/233; 704/208

(58) Field of Classification Search ................ 704/233, 704/208
See application file for complete search history.

(56) References Cited

U.S. PATENT DOCUMENTS 5,371,853 A 12/1994 Kao et al.
5,699,477 A 12/1997 McCree
5,706,392 A * 1/1998 Goldberg et al. ......... 704/200.1
5,809,459 A * 9/1998 Bergstrom et al. .......... 704/223
5,884,010 A * 3/1999 Chen et al. .................. 704/228
6,014,622 A * 1/2000 Su et al. ..................... 704/223
6,018,707 A 1/2000 Nishiguchi et al.
6,138,092 A * 10/2000 Zinser et al. ................ 704/223
6,233,550 B1 5/2001 Gersho et al.
6,308,155 B1 * 10/2001 Kingsbury et al. ....... 704/256.1
6,453,283 B1 * 9/2002 Gigi .......................... 704/207
6,675,144 B1 * 1/2004 Tucker et al. .............. 704/264
6,681,202 B1 * 1/2004 Miet et al. .................. 704/214
6,940,454 B2 * 9/2005 Paetzold et al. ............ 345/473
6,985,857 B2 * 1/2006 Adut .......................... 704/230
7,283,585 B2 * 10/2007 LeBlanc et al. ............ 375/222
2002/0016698 A1 * 2/2002 Tokuda ....................... 702/190
2002/0052738 A1 * 5/2002 Paksoy et al. .............. 704/219
2003/0050786 A1 * 3/2003 Jax et al. .................... 704/500
2004/0138874 A1 * 7/2004 Kaajas et al. .............. 704/205
2004/0153544 A1 * 8/2004 Kelliher et al. ............. 709/226
2005/0055219 A1 * 3/2005 Accardi et al. ............. 704/278
2006/0153286 A1 * 7/2006 Andersen et al. ............ 375/229
2007/0110042 A1 * 5/2007 Li et al. ...................... 370/352

OTHER PUBLICATIONS

Jacovo et al., Some experiments of 7 kHz audio coding at 16 kbit/s, IEEE ICASSP 1989, 192-195.*

* cited by examiner

*Primary Examiner*—David R Hudspeth
*Assistant Examiner*—Jakieda R Jackson
(74) *Attorney, Agent, or Firm*—Farjami & Farjami LLP

(57) ABSTRACT

An approach for improving quality of synthesized speech is presented. The input speech or residual is first separated into a voiced portion and a noise portion. The voice portion is coded using CELP methods. The noise portion of the input speech may be estimated at the decoder since it contains minimal voiced speech components. The separation is frequency dependent and is adaptive to the input speech. The separation may be accomplished using a lowpass/highpass filter combination. The information regarding bandwidth of the lowpass/highpass is presented to the decoder to facilitate reproduction of the noise portion of the speech.

44 Claims, 3 Drawing Sheets

SIGNAL DECOMPOSITION OF VOICED SPEECH FOR CELP SPEECH CODING

RELATED APPLICATIONS

The present application claims the benefit of U.S. provisional application Ser. No. 60/455,435, filed Mar. 15, 2003, which is hereby fully incorporated by reference in the present application.

U.S. patent application Ser. No. 10/799,503, "VOICING INDEX CONTROLS FOR CELP SPEECH CODING, ".

U.S. patent application Ser. No. 10/799,505, "SIMPLE NOISE SUPPRESSION MODEL,".

U.S. patent application Ser. No. 10/799,460, "ADAPTIVE CORRELATION WINDOW FOR OPEN-LOOP PITCH,".

U.S. patent application Ser. No. 10/799,504, "RECOVERING AN ERASED VOICE FRAME WITH TIME WARPING.".

BACKGROUND OF THE INVENTION

1. Field of the Invention

The present invention relates generally to speech coding and, more particularly, to Code Excited Linear Prediction (CELP) for wideband speech coding.

2. Related Art

Generally, a speech signal can be band-limited to about 10 kHz without affecting its perception. However, in telecommunications, the speech signal bandwidth is usually limited much more severely. It is known that the telephone network limits the bandwidth of the speech signal to between 300 Hz to 3400 Hz, which is known as the "narrowband". Such band-limitation results in the characteristic sound of telephone speech. Both the lower limit at 300 Hz and the upper limit at 3400 Hz affect the speech quality.

In most digital speech coders, the speech signal is sampled at 8 kHz, resulting in a maximum signal bandwidth of 4 kHz. In practice, however, the signal is usually band- limited to about 3600 Hz at the high-end. At the low-end, the cut-off frequency is usually between 50 Hz and 200 Hz. The narrowband speech signal, which requires a sampling frequency of 8 kb/s, provides a speech quality referred to as toll quality. Although this toll quality is sufficient for telephone communications, for emerging applications such as teleconferencing, multimedia services and high-definition television, an improved quality is necessary.

The communications quality can be improved for such applications by increasing the bandwidth. For example, by increasing the sampling frequency to 16 kHz, a wider bandwidth, ranging from 50 Hz to about 7000 Hz can be accommodated, which is referred to as the "wideband". Extending the lower frequency range to 50 Hz increases naturalness, presence and comfort. At the other end of the spectrum, extending the higher frequency range to 7000 Hz increases intelligibility and makes it easier to differentiate between fricative sounds.

Digitally, speech is synthesized by a well-known approach known as Analysis-By-Synthesis (ABS). Analysis-By-Synthesis is also referred to as closed-loop approach or waveform-matching approach. It offers relatively better speech coding quality than other approaches for medium to high bit rates. A known ABS approach is the so-called Code Excited Linear Prediction (CELP). In CELP coding, speech is synthesized by using encoded excitation information to excite a linear predictive coding (LPC) filter. The output of the LPC filter is compared against the voiced speech and used to adjust the filter parameters in a closed loop sense until the best parameters based upon the least error is found. The problem with this approach is that the waveform is difficult to match in the presence of noise in the speech signal.

Another method of speech coding is the so-called harmonic coding approach. Harmonic coding assumes that voiced speech is approximated by a series of harmonics. And when all the harmonics are added together, a quasi-periodic waveform appears. Thus working on the principle that voiced speech is quasi-periodic, it is easier to match voiced speech using prior art Harmonic coding approaches.

Waveform matching or harmonic coding is easier for periodic speech components than non-periodic speech components. This is because non-periodic speech signal is random-like and broadband thus would not fit in the basic harmonic model. However, the harmonics approximation approach may be too simplistic for real voiced signals because real voiced signals include irregular (i.e. noise) components. Thus, high quality waveform-matching becomes difficult even for voiced speech, because of significant irregular components that may exist in the voiced signal especially for wideband speech signal. These irregular components usually occur in the high frequency areas of the wideband voice signals but, may also be present throughout the voice band.

The present invention addresses the above voiced speech issue because real world speech signal may not be periodic enough so that a perfect waveform matching becomes difficult.

SUMMARY OF THE INVENTION

In accordance with the purpose of the present invention as broadly described herein, there is provided systems and methods for improving quality of synthesized speech by decomposing input speech into a voiced portion and a noise portion. The voice portion is coded using CELP methods thus allocating most of the bit budget to the voiced speech for true quality reproduction. This portion (voiced) covers mostly the low to mid frequency range. The noise portion of the input speech is allocated the least bit budget and may be estimated at the decoder since it contains minimal voiced speech components. The noise portion is usually in the high frequency range.

The decomposition of the input speech into the two portions is frequency dependent and is adaptive to the input speech. In one embodiment, the separation occurs after background noise has been removed from the input speech. The decomposition may be accomplished using a lowpass/highpass filter combination. The information regarding bandwidth of the lowpass/highpass may be presented to the decoder to facilitate reproduction of the noise portion of the speech. The information about the appropriate filter cut-off frequency may be provided to the decoder in the form of voicing index, for example.

The decoder may synthesize the input speech by using a CELP process on the voiced portion and injecting noise to represent the noise portion.

These and other aspects of the present invention will become apparent with further reference to the drawings and specification, which follow. It is intended that all such additional systems, methods, features and advantages be included within this description, be within the scope of the present invention, and be protected by the accompanying claims.

DETAILED DESCRIPTION

The present application may be described herein in terms of functional block components and various processing steps. It should be appreciated that such functional blocks may be realized by any number of hardware components configured to perform the specified functions. For example, the present application may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present application may employ any number of conventional techniques for data transmission, signaling, signal processing and conditioning, tone generation and detection and the like. Such general techniques that may be known to those skilled in the art are not described in detail herein.

Figure 1:
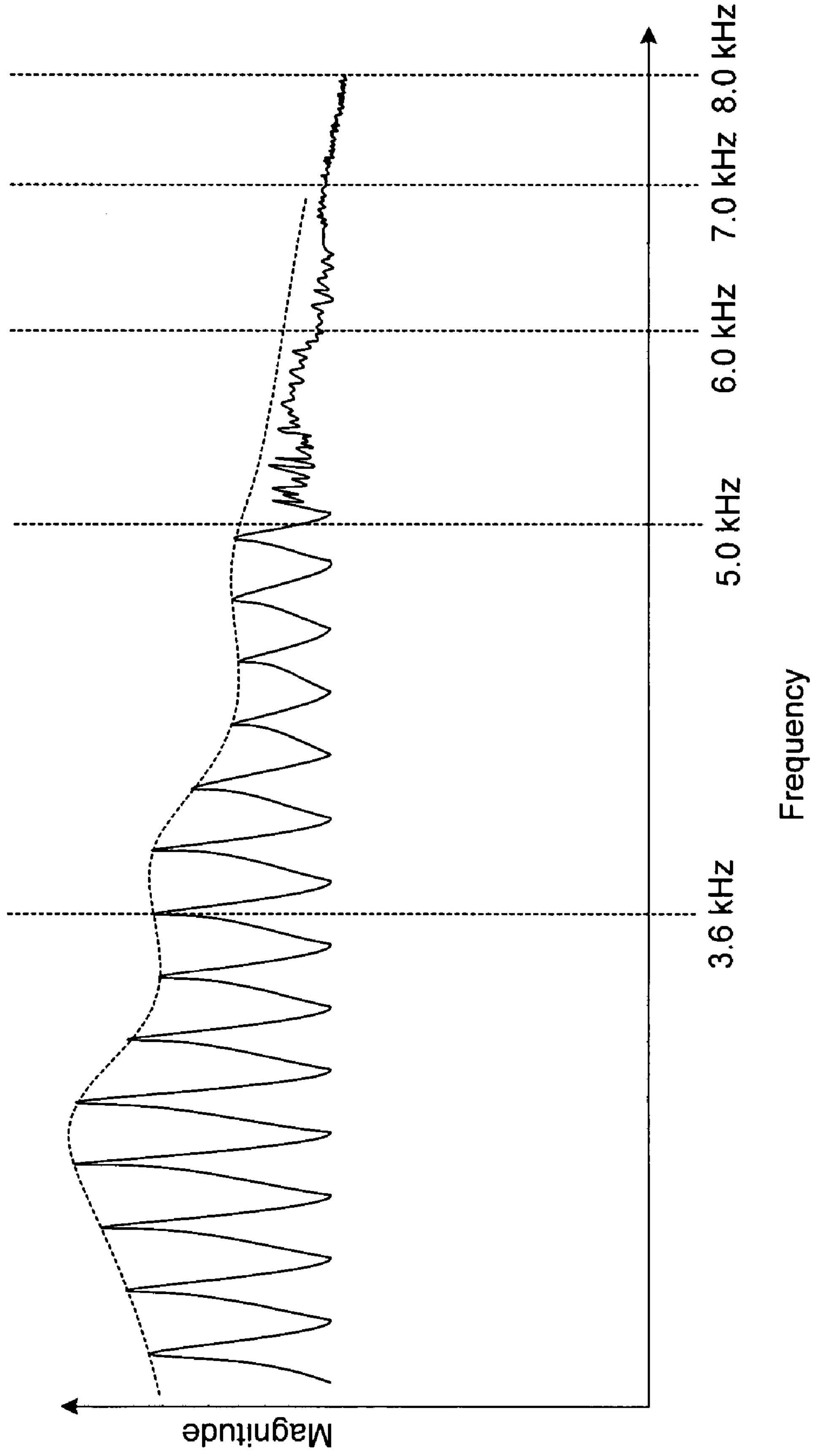
FIG. 1 is an illustration of the frequency domain characteristics of a voiced speech signal.

FIG. 1 is an illustration of the frequency domain characteristics of a voiced speech signal. In this illustration, the spectrum domain in the wideband extends from slightly above 0 Hz to around 7.0 kHz. Although the highest possible frequency in the spectrum ends at 8.0 kHz (i.e. Nyquist folding frequency) for a speech signal sampled at 16 kHz, this illustration shows that the energy is almost zero in the area between 7.0 kHz to 8.0 kHz. It should be apparent to those of skill in the arts that the ranges of signals used herein are for illustration purposes only and that the principles expressed herein are applicable to other signal bands.

As illustrated in FIG. 1, the speech signal is quite harmonic at lower frequencies, but at higher frequencies the speech signal does not remain as harmonic because the probability of having noisy speech signal increases as the frequency increases. For instance, in this illustration the speech signal exhibits traits of becoming noisy at the higher frequencies, e.g., above 5.0 kHz. If we call this frequency point (5.0 kHz) the voicing cut-off frequency, this voicing cut-off frequency could vary from 1 kHz until 8 kHz for different voiced signal. The noisy signal makes waveform matching at higher frequencies very difficult. Thus, techniques like ABS coding (e.g. CELP) becomes unreliable if high quality speech is desired. For example, in a CELP coder, the synthesizer is designed to match the original speech signal by minimizing the error between the original speech and the synthesized speech. A noisy signal is unpredictable thus making error minimization very difficult.

Given the above problem, the present invention decomposes the speech signal into two portions, namely a voiced (or major) portion and a noisy portion. The voiced portion comprises the region from low to high frequency (e.g., 0-5 kHz in FIG. 1) where the speech signal is relatively harmonic thus amenable to analysis-by-synthesis methods. Note that noise may be present in the voiced portion however, speech predominates in this region for voiced speech.

The noise portion may comprise random speech signal. Since most noise-like components are predominant in the high frequency region (as shown in FIG. 1), in one embodiment, the signal decomposition could be done by adaptive low-pass filtering and/or high-pass filtering of the speech residual signal.

Figure 2:
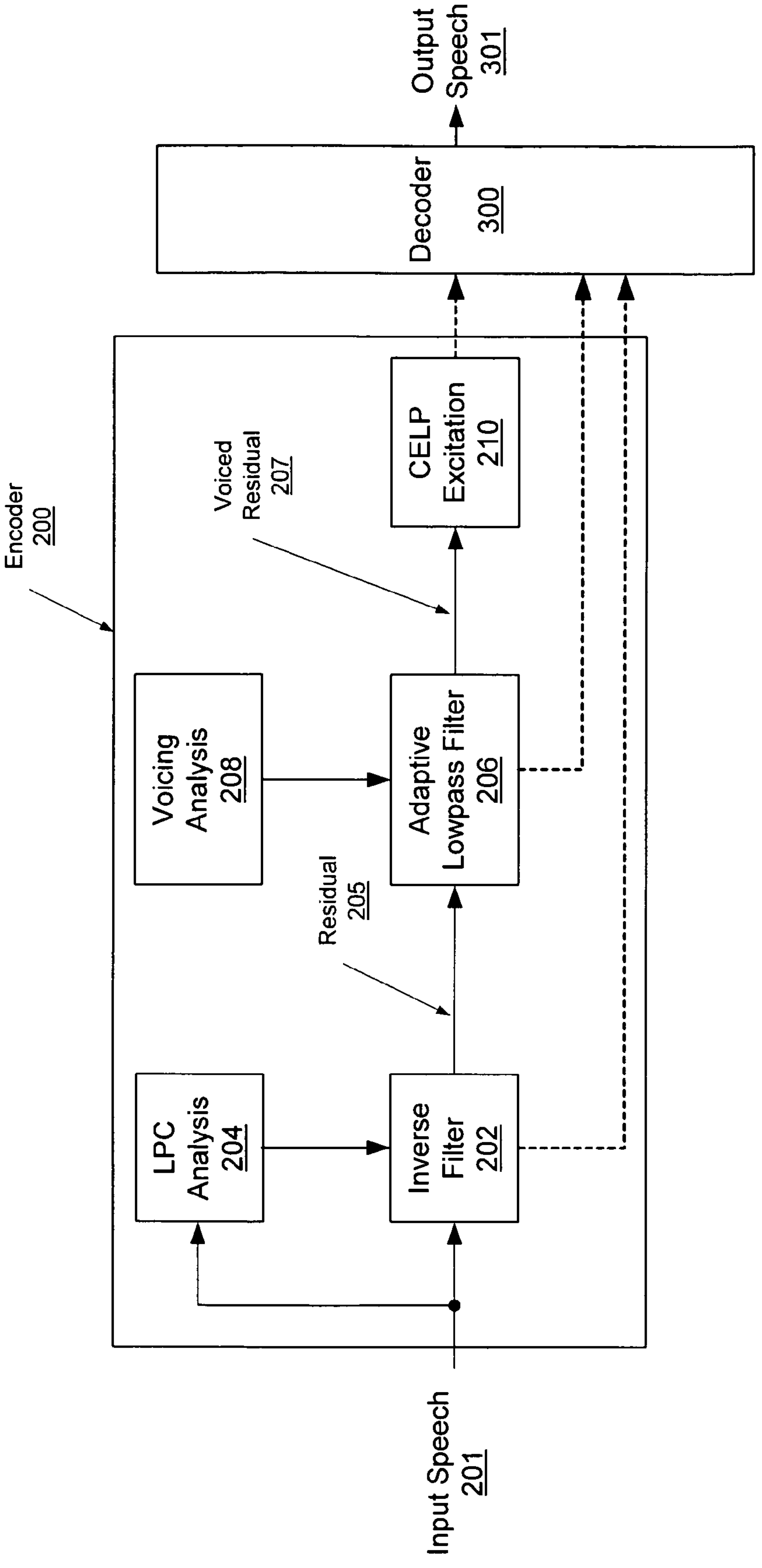
FIG. 2 is an illustration of separation of speech residual (or excitation) into a voiced component and a noise component in accordance with an embodiment of the present invention.

FIG. 2 is an illustration of separation of speech residual (or excitation) into a voiced component and a noise component in accordance with an embodiment of the present invention. In this illustration, Input Speech 201 is processed through LPC analysis 204 and Inverse filter 202 to generate Residual 205. Residual 205 is subsequently processed through an appropriate Lowpass filter 206 to generate Voiced Residual 207. Lowpass 206 may be adaptively selected from a group of preprogrammed low-pass filters that is known to both the encoder (e.g. 200) and the decoder (e.g. 300). For instance, the filter structure may be fixed but the bandwidth may vary depending on several factors, which may be determined through Voicing Analysis 208, such as: Pitch correlation, gender of the speaker, etc. Thus, the speech signal decomposition of the present invention is adaptive to speech.

In an embodiment, normalized Pitch correlation may be used to select an appropriate filter bandwidth. In such a case, the logic may be such that when normalized pitch correlation is close to 1 (one), the filter bandwidth is almost at infinity. This is because in such a case (i.e. pitch correlation close to one), the waveform of Input Speech 201 more closely resembles a harmonic model throughout the frequency band of interest. On the other extreme, the bandwidth selected may approach zero as pitch correlation approaches zero. In this case, i.e. pitch correlation close to zero, the waveform of Input Speech 201 more closely resembles an unvoiced speech model thus more characteristically resembles noise. Thus, the task is to find an appropriate relationship between normalized pitch correlation and filter bandwidth.

The selected filter may be communicated to the Decoder 300 using a group of bits that when decoded at the decoder indicates which filter was selected at the encoder. This group of bits may be referred to as the voicing index.

In accordance with one embodiment, a voicing index defines a plurality of low pass filters, such as seven or eight different low pass filters, for which three (3) bits are transmitted from the encoder to the decoder. In like manner, four (4) bits may be used when there are between eight and sixteen filter selections available. Of course, the number of different filters and the method of communicating the selected filter parameters depends on the complexity and accuracy of the implementation.

In one embodiment, the voiced portion 207 of the speech signal is encoded using CELP process in block 210. CELP processing may be desirable over Harmonic coding because it should provide better quality speech with higher bit budget. Harmonic coding is generally good for low frequency applications because the requirement for aggregate rate (bit budget) is less than for the CELP model. However, it is generally difficult for Harmonic models to reproduce very high quality speech in the presence of some noise since it may not be possible to completely separate noise from the voiced speech. Moreover, increasing the bit budget to relatively high bit-rate for a harmonic model does not improve the quality of the reproduction as much as a CELP model.

On the other hand, the CELP coder may still generate high quality speech even in the presence of some noise by simply increasing the bit budget. Thus, a CELP or similar high quality coder is preferably used on the voiced portion to improve the quality of the synthesized speech.

In one embodiment, CELP coder 210 spends the available bits to code the voiced residual portion 207 at the encoder and transmits the coded information, such as LPC parameters, pitch, energy, excitation, etc. to the decoder 300. At the decoder 300, the coded information is decoded and used to synthesize the voiced portion 309 (See FIG. 3), and the noisy portion is estimated using random noise excitation.

The noise portion, because it is hard to waveform match, does not have to be coded. Moreover, the noise portion may be represented by an excitation and an LPC filter envelope because once the LPC envelope is removed, the excitation is characteristically flat. Thus, the noise portion need not be coded because it could easily be estimated with knowledge of the LPC filter parameters and the magnitude of the voiced speech portion at the cutoff frequency of the lowpass filter 201.

The selected filter parameters may be communicated to the Decoder 300 using a group of bits (e.g. the voicing index) that when decoded at the decoder indicates which filter was selected for the noise portion. For example, if there are up to eight different filters available, then three bits may be used to indicate the selected filter. In like manner, four bits may be used when there are between eight and sixteen filter selections available. Of course, the number of different filters and the method of communicating the selected filter parameters depends on the complexity and accuracy of the implementation.

In one embodiment, the noise portion is not coded because an excitation (e.g. white noise) may be passed through the selected high-pass filter and LPC synthesis filter at the decoder 300 to synthesize the noise portion, which may then be added to the synthesized voiced portion to form Output Speech 301. The noise portion needs to be normalized to the magnitude of the voiced portion at the cutoff frequency of the lowpass filter at the decoder.

Other embodiments of the invention may use other convenient method to separate the voiced portion from the noise portion. For instance, a harmonic model may be used. In the harmonic model, the true input speech may be compared to the harmonic prediction of the speech and the model that gives the least error (e.g. Mean Square Error) may be selected to represent the voiced portion.

Figure 3:
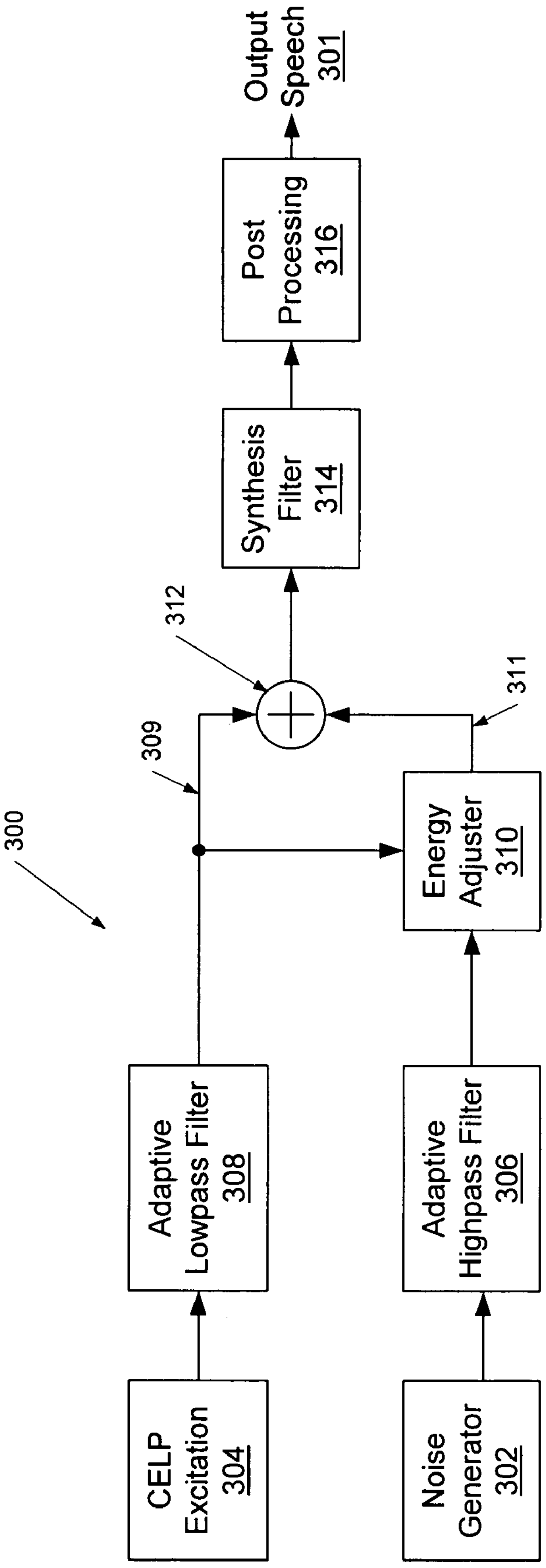
FIG. 3 is an illustration of synthesis of voiced speech from voiced components in accordance with an embodiment of the present invention.

In one or more embodiments, each low pass filter implemented for separation of the voiced portion from the noise portion, there is a corresponding high pass filter. At the decoder side, the voicing index value indicates which low pass filter (thus its corresponding high pass filter) was used in separating the voiced portion from the noisy portion and this knowledge is used to synthesize the input speech signal. FIG. 3 is an illustration of synthesis of speech at the decoder in accordance with an embodiment of the present invention.

In this illustration, the voiced portion is decoded at block 304 based on CELP parameters received from the encoder. The generated signal is adaptively filtered in block 308, using the adaptive lowpass filter parameters obtained from the voicing index, to generate the voiced portion 309. Further, a noise generator 302 may be utilized at the decoder to generate random noise, which is then processed through the high pass filter 306. Highpass filter 306 is also adaptive and is based on information obtained from the voicing index and is the corresponding one of lowpass filter 308.

In block 310, the signal energy of the noise portion is adjusted proportionately with the generated voiced potion, so that the energy remains flat when the voiced component and the noise component are summed in block 312. In one embodiment, the noise portion 311 may be generated using a highpass filter, e.g. 306, which may be implemented with the transfer function (1-Lowpass 308). Thus, after selection of an appropriate filter bandwidth, Voiced portion 309 and Noise portion 311 may be readily generated using lowpass and highpass filters, respectively.

After summation, in block 312, of voiced portion 309 and noise portion 311, the resulting speech signal is processed through synthesis filter 314 and post processing block 316 to obtain the output speech signal, 301, which is the synthesized speech.

Although the above embodiments of the present application are described with reference to wideband speech signals, the present invention is equally applicable to narrowband speech signals.

What is claimed is:

1. A method of processing speech comprising:

obtaining an input wideband speech signal including a background noise;

decomposing said input wideband speech signal into a voiced portion and a noisy portion using an adaptive separation component having a filter cut-off frequency, wherein said voiced portion is a portion of said input wideband speech signal for waveform matching and said noisy portion is a portion of said input wideband speech signal not for waveform matching, and wherein said filter cut-off frequency is above 4 kHz;

processing said voiced portion of said input wideband speech signal to obtain a first set of parameters using analysis by synthesis approach; and processing said noisy portion of said input wideband speech signal to obtain a second set of parameters using open loop approach;

transmitting said first set of parameters, said second set of parameters and a voicing index to a decoder, wherein said voicing index provides said filter cut-off frequency to said decoder for a wideband signal composition.

2. The method of claim 1, further comprising removing said background noise from said input wideband speech signal before decomposing said input wideband speech signal into said voiced portion and said noisy portion.

3. The method of claim 1, wherein said separation component is a lowpass filter.

4. The method of claim 3, wherein bandwidth of said lowpass filter is dependent upon a characteristic of said input wideband speech signal.

5. The method of claim 4, wherein said characteristic of said input wideband speech signal is pitch correlation.

6. The method of claim 4, wherein said characteristic of said input wideband speech signal is gender of a person uttering said input wideband speech signal.

7. The method of claim 1, wherein said analysis by synthesis approach is a Code Excited Linear Prediction (CELP) process.

8. The method of claim 1, wherein said first set of parameters comprises pitch of said voiced portion of said input wideband speech signal.

9. The method of claim 1, wherein said first set of parameters comprises excitation of said voiced portion of said input wideband speech signal.

10. The method of claim 1, wherein said first set of parameters comprises energy of said voiced portion of said input wideband speech signal.

11. The method of claim 1, wherein said second set of parameters comprises characteristics of said voicing index of said input wideband speech signal.

12. The method of claim 1, wherein said decoder device uses said first set of parameters to synthesize said voiced portion of said input wideband speech signal.

13. The method of claim 1, wherein said decoder device uses said second set of parameters to synthesize said noisy portion of said input wideband speech signal.

14. The method of claim 1, wherein said filter cut-off frequency is communicated to said decoder using a plurality of bits in said voicing index to indicate to said decoder which filter to use for said signal decomposition.

15. The method of claim 1, wherein said voicing index defines a plurality of low pass filters.

16. An apparatus for processing speech comprising:

a receiver module for receiving an input wideband speech signal including a background noise;

an adaptive separation module having a filter cut-off frequency for separating said input wideband speech signal into a voiced portion and a noisy portion, wherein said voiced portion is a portion of said input wideband speech signal for waveform matching and said noisy portion is a portion of said input wideband speech signal not for waveform matching, and wherein said filter cut-off frequency is above 4 kHz;

an analysis-by-synthesis module for processing said voiced portion of said input wideband speech signal to obtain a first set of parameters; and an open loop analysis module for processing said noisy portion of said input wideband speech signal to obtain a second set of parameters;

a transmitting module for transmitting said first set of parameters, said second set of parameters and a voicing index to a decoder, wherein said voicing index provides said filter cut-off frequency to said decoder for signal composition.

17. The apparatus of claim 16, wherein said background noise is removed from said input wideband speech signal before separating said input wideband speech signal into said voiced portion and said noisy portion.

18. The apparatus of claim 16, wherein said separation module is a lowpass filter.

19. The apparatus of claim 18, wherein bandwidth of said lowpass filter is dependent on a characteristic of said input wideband speech signal.

20. The apparatus of claim 19, wherein said characteristic of said input wideband speech signal is pitch correlation.

21. The apparatus of claim 19, wherein said characteristic of said input wideband speech signal is gender of a person uttering said input wideband speech signal.

22. The apparatus of claim 16, wherein said analysis-by-synthesis processor is a Code Excited Linear Prediction (CELP) process.

23. The apparatus of claim 16, wherein said first set of parameters comprises pitch of said voiced portion of said input wideband speech signal.

24. The apparatus of claim 16, wherein said first set of parameters comprises excitation of said voiced portion of said input wideband speech signal.

25. The apparatus of claim 16, wherein said first set of parameters comprises energy of said voiced portion of said input wideband speech signal.

26. The apparatus of claim 16, wherein said second set of parameters comprises characteristics of said voicing index of said input wideband speech signal.

27. The apparatus of claim 16, wherein said decoder device uses said first set of parameters to synthesize said voiced portion of said input wideband speech signal.

28. The apparatus of claim 16, wherein said decoder device uses said second set of parameters to synthesize said noisy portion of said input wideband speech signal.

29. The apparatus of claim 16, wherein said filter cut-off frequency is communicated to said decoder using a plurality of bits in said voicing index to indicate to said decoder which filter to use for said signal decomposition.

30. The apparatus of claim 16, wherein said voicing index defines a plurality of low pass filters.

31. An apparatus for synthesizing speech comprising:

a first module for obtaining a first set of parameters regarding a voiced portion of an input wideband speech signal;

a second module for obtaining a second set of parameters regarding a noisy portion of said input wideband speech signal;

a third module for obtaining a voicing index, wherein said voicing index provides a filter cut-off frequency for signal composition, wherein said voiced portion is a portion of said input wideband speech signal for waveform matching and said noisy portion is a portion of said input wideband speech signal not for waveform matching, and wherein said filter cut-off frequency is above 4 kHz;

a fourth module for synthesizing said voiced portion of said input wideband speech signal from said first set of parameters;

a fifth module for synthesizing said noisy portion of said input s wideband speech signal from said second set of parameters; and a sixth module for combining said synthesized voiced portion and said synthesized noisy portion based on said filter cut-off frequency for signal composition to produce a synthesized version of said wideband input speech signal.

32. The apparatus of claim 31, wherein said first set of parameters comprises pitch of said voiced portion of said wideband input speech signal.

33. The apparatus of claim 31, wherein said first set of parameters comprises excitation of said voiced portion of said wideband input speech signal.

34. The apparatus of claim 31, wherein said first set of parameters comprises energy of said voiced portion of said wideband input speech signal.

35. The apparatus of claim 31, wherein said synthesized noisy portion is estimated.

36. The apparatus of claim 31, wherein said filter cut-off frequency is communicated using a plurality of bits in said voicing index to indicate which filter to use for said signal decomposition.

37. The apparatus of claim 31, wherein said voicing index defines a plurality of low pass filters.

38. A method for synthesizing speech comprising:

obtaining a first set of parameters regarding a voiced portion of an input wideband speech signal;

obtaining a second set of parameters regarding a noisy portion of said input speech signal;

obtaining a voicing index, wherein said voicing index provides a filter cut-off frequency for signal composition, wherein said voiced portion is a portion of said input wideband speech signal for waveform matching and said noisy portion is a portion of said input wideband speech signal not for waveform matching, and wherein said filter cut-off frequency is above 4 kHz;

synthesizing said voiced portion of said wideband input speech signal from said first set of parameters;

synthesizing said noisy portion of said input wideband speech signal from said second set of parameters; and combining said synthesized voiced portion and said synthesized noisy portion based on said filter cut-off frequency for signal composition to produce a synthesized version of said wideband input speech signal.

39. The method of claim 38, wherein said first set of parameters comprises pitch of said voiced portion of said wideband input speech signal.

40. The method of claim 38, wherein said first set of parameters comprises excitation of said voiced portion of said wideband input speech signal.

41. The method of claim 38, wherein said first set of parameters comprises energy of said voiced portion of said wideband input speech signal.

42. The method of claim 38, wherein said synthesized noisy portion is estimated.

43. The method of claim 38, wherein said filter cut-off frequency is communicated using a plurality of bits in said voicing index to indicate which filter to use for said signal decomposition.

44. The method of claim 38, wherein said voicing index defines a plurality of low pass filters.

* * * * *